ced Apr. 19, 1966

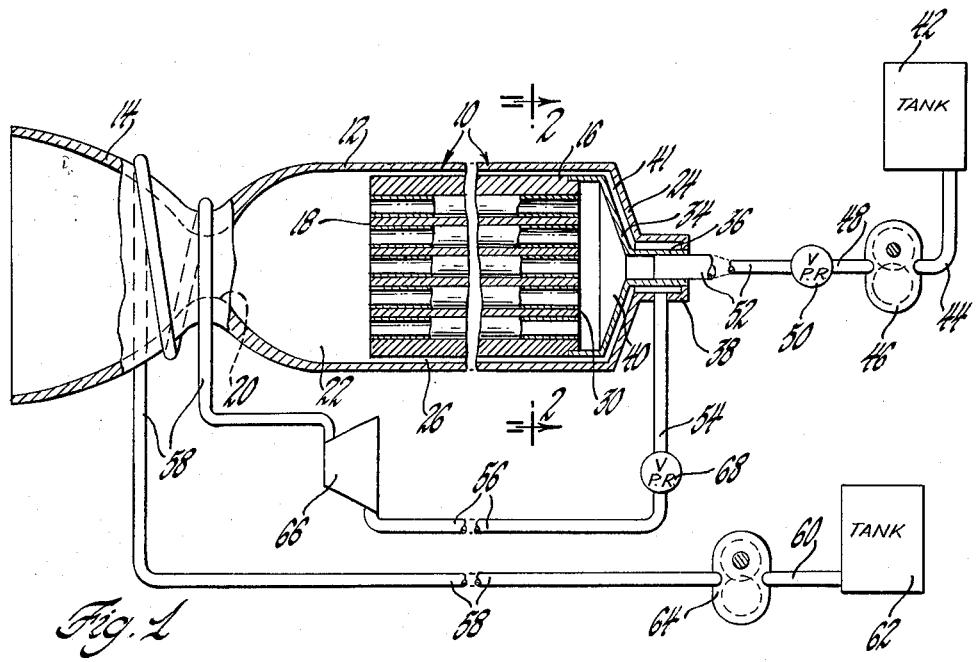

3,246,466
SOLID-LIQUID PROPELLANT ROCKET
Arthur I. Masters, Jupiter, Fla., assignor to General Motors Corporation, Detroit, Mich., a corporation of Delaware
Filed Feb. 9, 1962, Ser. No. 173,609
2 Claims. (Cl. 60—35.6)

This invention relates to a hybrid solid-liquid propellant reaction type motor. More particularly, it relates to a rocket motor construction chemically combining a number of propellants, which together have an extremely high heat of reaction, with a fluid diluent relatively inert to the propellants, to produce a working fluid having not only a high specific impulse but providing a low combustion chamber temperature. The nozzle cooling requirements and the selection of the materials for which the combustion chamber and exhaust nozzle are made are thus rendered less critical.

Of prime consideration in the selection of a propellant for rocket engines or similar reaction type motors, is the specific impulse level of the propellant. The specific impulse is affected roughly by two variables, one being the heat of reaction or the thermal energy imparted to the system, and the other being the efficiency with which this energy is converted to propulsive force. Therefore, it follows that the propellant combination producing the greatest specific impulse would be one having a reaction producing the greatest possible source of thermal energy, together with a means to convert this thermal energy to useful work in the most efficient manner.

It is therefore an object of this invention to provide a fluid jet reaction motor construction having a high specific impulse level and a low combustion chamber temperature attained by the reaction of a plurality of solid and liquid propellants.

A further object of this invention is to provide a multi-propellant fluid jet reaction motor of a construction enabling the use of an uncooled jet exhaust nozzle.

Other objects, features and advantages of the invention will become apparent upon reference to the succeeding detailed description of the invention and to the drawings illustrating the preferred embodiment thereof, wherein, FIGURE 1 is a schematic cross sectional view of a fluid jet reaction motor embodying the invention, and FIGURE 2 is an enlarged cross sectional view taken on a plane indicated by and viewed in the direction of the arrows 2—2 of FIG. 1.

As stated previously, the invention relates to a reaction motor construction utilizing a combination of propellants to provide a high specific impulse working fluid. In this respect, the inclusion of lightweight metallic elements, of which lithium, beryllium and magnesium are examples, in the propellant system are particularly attractive because of their large thermal energy release and the resulting high specific impulse potential. Lithium is particularly desirable for use as a prime fuel because of certain unique physical characteristics, such as relatively low melting point, wide liquid range, good thermal conductivity, and high specific heat. For example, prior to this invention, the reaction of hydrogen with fluorine, which offers a maximum energy release of approximately 5775 B.t.u./lb., produced an equilibrium energy release of approximately 4900 B.t.u./lb., at maximum specific impulse, for example, and had long been considered as the ultimate combination for high specific impulse chemical rocket propellants.

However, the formation of the reaction product of a lithium and fluorine combination, for example, in its solid state, offers approximately a 10,000 B.t.u./lb. thermal energy release, for example, as compared to that of the hydrogen-fluorine reaction. The equilibrium combustion chamber temperature for a lithium-fluorine reaction, however, is approximately 9600° R., for example. At this temperature, the reaction product is not solid but a gas, and has a net energy release of only 4550 B.t.u./lb., for example, because about 68% of the reaction product is gaseous lithium fluoride, the remaining 32% consisting mainly of uncombined free lithium and dissociated fluorine gas. Also, the high equilibrium combustion chamber temperature, 9600° R., renders the gas unsuitable for use because known materials from which the combustion chamber and nozzle are constructed are not capable of withstanding such a temperature. Therefore, the gaseous lithium fluorine reaction is not an efficient one and actually releases less energy or heat than a hydrogen and fluorine reaction having a lower equilibrium chamber temperature.

The problem exists, therefore, as to how to condense the gaseous lithium fluoride to obtain the highest possible energy release and yet have a working fluid that can be efficiently expanded through the exhaust nozzle. A solid reaction product of course would merely choke the nozzle and not be expandable through the nozzle.

The solution to this problem lies in adding a cool fluid diluent to the lithium and fluorine to condense the lithium fluoride transferring the heat released by condensation to the diluent to provide a working fluid suitable for efficient expansion through the nozzle.

For the most efficient expansion through the nozzle, the lithium fluoride would in all probability not be reduced completely to its solid state but would be condensed to its liquid state and be diluted by the diluent. While the thermal energy (9765 B.t.u./lb., for example) released by condensation of the lithium fluoride to its liquid state may not be as great as that obtained by condensing the reaction to its solid state, it is still substantially greater than that energy obtained by the reaction of hydrogen and fluorine (5775 B.t.u./lb.).

The diluent, which is relatively inert to the lithium and fluorine, must lower the combustion temperature to reduce vaporization and dissociation. It is also necessary that the diluent represents the smallest possible mass fraction addition, so that the dilution of available energy per unit weight of total propellant is kept to a minimum.

These requirements therefore specify that the diluent to be added have a high specific heat per unit mass for effective cooling, a low molar specific heat for sufficient expansion, and, hence, a low molecular weight to provide an efficient working fluid. An example of a component meeting these requirements is liquid hydrogen.

As increasing amounts of the cryogenic hydrogen, for example, are added to the lithium-fluorine reactants, the equilibrium combustion chamber temperature is decreased and, resultantly, more lithium fluoride condensed, thereby transferring the energy released by condensation to the diluent hydrogen fluid. At optimum specific impulse, therefore, the addition of hydrogen to the lithium-fluorine reactants will lower the equilibrium combustion chamber temperature from, for example, 9600° R. to approximately 3700° R., but the net heat release per total mass of propellant will have risen for example, from 4550 B.t.u./lb. to approximately 6100 B.t.u./lb.

The dilution by hydrogen lowers the total overall thermal energy of the propellant system. Therefore, it is essential to choose as the main heat source a chemical reaction system yielding exhaust products with exceptional high heats of formation so that upon dilution by hydrogen or similar components, the resulting products will still have a total energy level sufficient to provide the desired impulse.

The preferred embodiment of the high specific impulse reaction motor of this invention, therefore, consists, in general, of a solid grain propellant secured within a rocket casing closed at one end and having a fixed jet exhaust nozzle formed at its opposite end, with a space between the grain and nozzle to form a combustion chamber. An oxidizer as well as a dual-purpose diluent is injected into the combustion chamber to chemically react with the solid propellant to produce a gaseous reaction product of high specific impulse. The diluent not only converts the reaction product to a working fluid acceptable for expansion through the nozzle but also cools the combustion chamber to a temperature below the melting points of the materials of which the nozzle is made.

More specifically, FIG. 1 shows a fluid jet reaction motor 10, such as a rocket or the like, having an annular longitudinally extending casing 12 of stainless steel or the like formed at one end with a convergent-divergent jet exhaust nozzle 14. A solid grain propellant 16 of lithium, for example, is secured centrally within the casing 12 by suitable struts (not shown) with one end face 18 spaced from the nozzle inlet 20 to provide a combustion chamber 22. The opposite end of the casing is closed by a cap 24 either formed integrally with it or secured to the casing in any suitable manner, such as by welding or the like.

The struts radially space the grain 16 from the casing to provide a fluid annulus 26 for the passage of a diluent into the combustion chamber in a manner to be described. The grain 16 is provided with a large number, sixteen in this instance, of longitudinal bores 28 extending from the one grain face 18 to the other face 30. Each of the bores is fitted with a thin metal tube 32 open at opposite ends. The tubes conduct a liquid oxidizer through the grain to the combustion chamber and are therefore constructed of a material such as stainless steel, for example, inert to both the grain and oxidizer.

The upstream face 30 of the grain is covered by a hollow annular cap 34 having a hollow stem 36 projecting through the hollow stem 38 of cap 24. Cap 34 not only provides a chamber 40 between it and the end of the grain, but also is spaced from cap 24 to provide an annular fluid inlet passage 41 to annulus 26. Chamber 40 is shown connected to a supply of fluid oxidizer, such as liquid fluorine, for example, in a tank 42 by means of a connecting line 44, a pump 46, line 48, a pressure regulator valve 50, and a conduit 52 projecting into the stem 36 of cap 34. The details of the tank, pump and valve are known and are unnecessary for an understanding of the invention and are therefore not given. Suffice it to say, however, that the pump may be of the positive displacement gear type and injects the fluorine into chamber 40 and through tubes 32 into the combustion chamber at the proper pressure. The pump can be driven by any suitable means (not shown).

The annular passage 26 and its connecting passage 41 are shown connected through lines 54, 56, 58 and 60 to a liquid diluent tank 62, in this instance containing liquid hydrogen. The diluent is drawn from the tank by a positive displacement gear type pump 64 and is discharged through an accessory drive turbine 66 and a pressure regulator valve 68 into passage 41. Connecting line 58 is shown as coiled around the throat and exit portion of the nozzle casing for absorption of its heat by the cryogenic (−453° F., for example) hydrogen in the line. However, the low temperature (3700° R., for example) of operation of the combustion chamber effected in a manner to be described may render this additional cooling of the nozzle unnecessary, and, therefore, it may be omitted. In that case, line 58 would be connected directly from pump 64 to turbine 66.

In operation, the liquid fluorine is pumped from the tank 42 into chamber 40 and through tubes 32 into the combustion chamber 22 adjacent the face 18 of the lithium grain. Simultaneously, the liquid hydrogen diluent is pumped from the tank 54 by the pump 64 into the supply annulus 41, through the annulus 26, and into the combustion chamber 22 where it is brought together with the fluorine oxidizer and burns simultaneously. The heat generated by this chemical reaction on the exposed face 18 of the lithium core causes the lithium to react also.

As described previously, the high specific impulse level desired is obtained only when condensation of the reaction product of lithium with fluorine occurs. However, the initial reaction of lithium with fluorine alone in combustion chamber 22 yields temperatures above 9600° R. without any condensation of the lithium-fluorine formed. Therefore, condensation of the lithium-fluorine will not take place until the temperature has been reduced through either radiation or convection losses to the hydrogen.

Initially, therefore, the hydrogen, fluorine and lithium chemically combine in the combustion chamber with some lithium fluoride being condensed from the gaseous reaction product by the low temperature hydrogen and diluted into a working fluid acceptable for expansion through the nozzle. A light metal such as lithium preferentially reacts with the fluorine rather than the hydrogen; in this respect, it might be stated that the hydrogen is relatively inert with respect to the lithium and fluorine. Therefore, as more and more hydrogen is added to the chamber, a less percentage of hydrogen by total volume of reaction product is combined with the lithium. This results in more and more lithium fluoride being condensed and diluted by the hydrogen into a high specific impulse working fluid that is then expanded efficiently out of the exhaust nozzle, with more and more free hydrogen being released from the reaction to pass out of the combustion chamber. For example, at optimum specific impulse, the principal components are approximately 12% lithium fluoride (approximately 90% condensed) and 88% free hydrogen, with very little hydrogen fluoride or other products, the low temperature and condensation of the metal reaction product strongly shifting the equilibrium away from the oxidation of the hydrogen.

This continued reaction, combination condensation and dilution effects a simultaneous regressive burning of the grain 16 and the ends of the thin walled tubes 28 by the heat of formation of the reaction product. This therefore assures that the fluorine oxidizer and hydrogen diluent are always injected into the combustion chamber at the face of the grain propellant. The continuous injection of the cool hydrogen and the progressively lesser reaction of the hydrogen with the lithium thereby depresses the combustion chamber gas temperature to a value of say, 3700° R., for example, which is well below the melting temperature of many of the materials from which the nozzle may be constructed. Additional cooling of the nozzle is therefore unnecessary. Therefore, it will be seen that the high heat of formation of the reaction product and the energy released by condensation is absorbed by the hydrogen so that a working fluid of high specific impulse is formed in the combustion chamber and is expanded efficiently through the nozzle to produce the desired thrust.

The hybrid solid-liquid propellant engine described has several major advantages. One is that the nozzle cooling requirements are minimized because of the low flame temperatures. Another is that pumping requirements are reduced from 15 to 50% because the major fuel is already in the chamber. Furthermore, the high reactivity of the lithium and fluorine permits the use of an end burning design for the solid fuel, thereby yielding a high loading density. Also, the use of thin walled consumable metal tubes for the fluorine injection through the grain permits burning off of the showerhead injector with the regression of the metal grain surface.

While specific examples of the solid and liquid tripropellants, i.e., lithium, fluorine and hydrogen, have been recited for a clearer understanding of the invention, it will be clear to those skilled in the arts to which the invention pertains that other propellants and oxidizers and diluents relatively inert to the other components could be used and in various combinations without departing from the scope of the invention as long as high heats of reaction, condensation, and efficient working fluids are obtained. For example, beryllium, beryllium hydride, magnesium or pentaborane combined with oxygen or ozone and hydrogen or helium, all offer high performance levels and low equilibrium combustion chamber temperatures. Also, lithium could be used as a liquid in some instances to provide an all liquid tripropellant engine. Also, as an alternative, the three propellants could be incorporated into two chemical propellants by, for example, the use of slurries of a solid in a liquid to produce a single material to which is added the hydrogen or helium. Also, a solution of two or more chemical ingredients could be used such as liquid pentaborane saturated with helium or hydrogen.

From the foregoing, therefore, it will be seen that this invention provides a reaction motor utilizing high performance fuels previously unusable due to the physical state of their reaction products and because of the inability of known materials to withstand the equilibrium combustion chamber temperatures of these products.

While the invention has been illustrated in the drawings in connection with a rocket engine, it will be clear to those skilled in the arts to which the invention pertains that it would have uses in many installations other than that shown and that many modifications and changes may be made thereto without departing from the scope of the invention.

I claim:
1. A high specific impulse fluid jet reaction motor comprising a longitudinally extending casing closed at one end and formed with a fluid jet exhaust nozzle at its other end, means securing a light metal solid propellant grain to and within said casing and radially spaced therefrom to define a substantially annular open end fluid passage between said casing and grain, one end of said grain being spaced axially from said nozzle to define a combustion chamber therebetween, a source of fluid oxidizer under pressure, said grain having a plurality of open end conduits connected to said source of oxidizer and extending through said grain from one end to the other for the injection of said oxidizer into said combustion chamber, a source of cyrogenic fluid diluent under pressure connected to one end of said passage to flow therethrough and into said combustion chamber, said grain and oxidizer chemically reacting to form a fluid reaction product, said diluent condensing and diluting said reaction product to a working fluid of high specific impulse for expansion through said nozzle, the reaction of the oxidizers and grain regressively burning the one end of the grain and consuming the ends of the conduits adjacent the combustion chamber permitting continuous injection of the oxidizers at the face of the grain.

2. A high specific impulse fluid jet reaction motor comprising a longitudinally extending casing closed at one end and formed with a fluid jet exhaust nozzle at its other end, means securing a light metal solid propellant grain to and within said casing and radially spaced therefrom to define a substantially annular open end fluid passage between said casing and grain, one end of said grain being spaced axially from said nozzle to define a combustion chamber therebetween, hollow shroud means connected to the other end of said grain and covering the face thereof, a source of fluid oxidizer under pressure connected to the hollow of said shroud means to contact the grain face, said grain having a plurality of conduits opening into the hollow of said shroud means to receive said oxidizer therein and extending longitudinally through said grain from one end to the other for the injection of said oxidizer into said combustion chamber, a source of cryogenic fluid diluent under pressure connected to one end of said passage to flow therethrough and into said combustion chamber, said grain and oxidizer and diluent chemically reacting to initially form a high temperature fluid reaction product, said diluent condensing and diluting said reaction product to a working fluid of high specific impulse for expansion through said nozzle, said conduits comprising a material inert to the fuel and oxidizer, the reaction of said grain and oxidizers regressively burning the one end of said grain, the heat of said reaction consuming the ends of said conduits at the one grain end permitting the continuous injection of said oxidizers at the face of the one end of said grain.

References Cited by the Examiner

UNITED STATES PATENTS

| | | | |
|---|---|---|---|
| 2,559,814 | 7/1951 | Whittle | 60—39.28 |
| 2,906,094 | 9/1959 | Damon et al. | 60—39.47 |
| 2,945,343 | 7/1960 | Gongwer | 60—37 X |
| 3,040,518 | 6/1962 | Rae | 60—35.6 |
| 3,049,870 | 8/1962 | Chamberlain | 60—35.6 |
| 3,077,073 | 2/1963 | Kuhrt | 60—35.6 |
| 3,110,154 | 11/1963 | Edelbaum et al. | 60—35.6 |
| 3,144,751 | 8/1964 | Blackman et al. | 60—35.6 |

FOREIGN PATENTS

| | | |
|---|---|---|
| 474,140 | 11/1914 | France. |
| 565,952 | 12/1944 | Great Britain. |

OTHER REFERENCES

"Rocket Propellant Handbook," by Boris Kit & Douglas S. Evered, published by The Macmillan Company of New York, p. 142.

MARK NEWMAN, *Primary Examiner.*

SAMUEL FEINBERG, SAMUEL LEVINE, *Examiners.*